United States Patent [19]
Graham et al.

[11] Patent Number: 5,743,721
[45] Date of Patent: Apr. 28, 1998

[54] BLOWER ASSEMBLY HAVING INTEGRAL AIR FLOW COOLING DUCT

[75] Inventors: Mark A. Graham, Kettering; Michael J. Neely, Dayton; John R. Savage, Kettering, all of Ohio

[73] Assignee: ITT Automotive Electrical Systems, Inc., Auburn Hills, Mich.

[21] Appl. No.: 640,357

[22] Filed: Apr. 30, 1996

[51] Int. Cl.⁶ .............................. F01D 1/12; F04B 17/00; H02K 9/00

[52] U.S. Cl. .................... 415/58.4; 415/203; 415/206; 417/370; 417/423.8; 310/59; 310/58; 310/60 R

[58] Field of Search .................... 417/423.8, 370; 310/58, 59, 60 R, 62, 63; 415/203, 206, 58.4

[56] References Cited

U.S. PATENT DOCUMENTS

| | | | |
|---|---|---|---|
| 918,894 | 4/1909 | Noe | 310/58 |
| 2,502,669 | 4/1950 | Pollard | 310/58 |
| 2,773,666 | 12/1956 | Martin | 415/203 |
| 3,332,612 | 7/1967 | Gross | 415/206 |
| 4,082,068 | 4/1978 | Hale | 123/41.02 |
| 4,275,688 | 6/1981 | Abe et al. | 123/41.12 |
| 4,330,899 | 5/1982 | Miller et al. | 15/326 |
| 4,390,049 | 6/1983 | Albertson | 141/92 |
| 4,434,749 | 3/1984 | Morita et al. | 123/41.02 |
| 4,438,732 | 3/1984 | Seifert | 123/41.05 |
| 4,475,485 | 10/1984 | Sakakibara et al. | 123/41.05 |
| 4,590,892 | 5/1986 | Nose et al. | 123/41.12 |
| 4,644,909 | 2/1987 | Nishikata et al. | 123/41.1 |
| 4,741,293 | 5/1988 | Itoh et al. | 123/41.79 |
| 5,040,943 | 8/1991 | Dwyer et al. | 417/423.8 |
| 5,111,774 | 5/1992 | Hiramoto et al. | 123/41.1 |
| 5,399,068 | 3/1995 | Park | 415/206 |
| 5,415,134 | 5/1995 | Stewart, Jr. | 123/41.01 |
| 5,551,836 | 9/1996 | Roth et al. | 415/206 |
| 5,601,400 | 2/1997 | Kondo et al. | 415/206 |
| 5,664,916 | 9/1997 | Link et al. | 310/58 |

*Primary Examiner*—Bibhu Mohanty
*Attorney, Agent, or Firm*—J. Gordon Lewis; Thomas N. Twomey

[57] ABSTRACT

A blower assembly includes a motor cover having (1) a body portion defining a motor cavity, (2) an air flow guide surface connected to an end of the body portion, the guide surface extending radially outwardly from the body portion, and (3) a cooling duct integrally formed with the body portion and having an inlet and an outlet, the inlet being located at the end of the body portion and the outlet being defined in a sidewall of the body portion. The blower assembly further includes a motor positionable in the motor cavity, the motor having a motor shaft having a central axis. In addition, the blower assembly includes a fan housing is connected to the motor cover, wherein (1) the fan housing defines a scroll cut-off line, and (2) a plane passes through the scroll cut-off line and the central axis, and (3) the cooling duct is positioned adjacent to the plane. The blower assembly also includes a fan positioned within the fan housing, wherein (1) the fan rotates in a rotational direction, and (2) the cooling duct is positioned on the upstream side of the plane relative to the rotational direction of the fan.

3 Claims, 7 Drawing Sheets

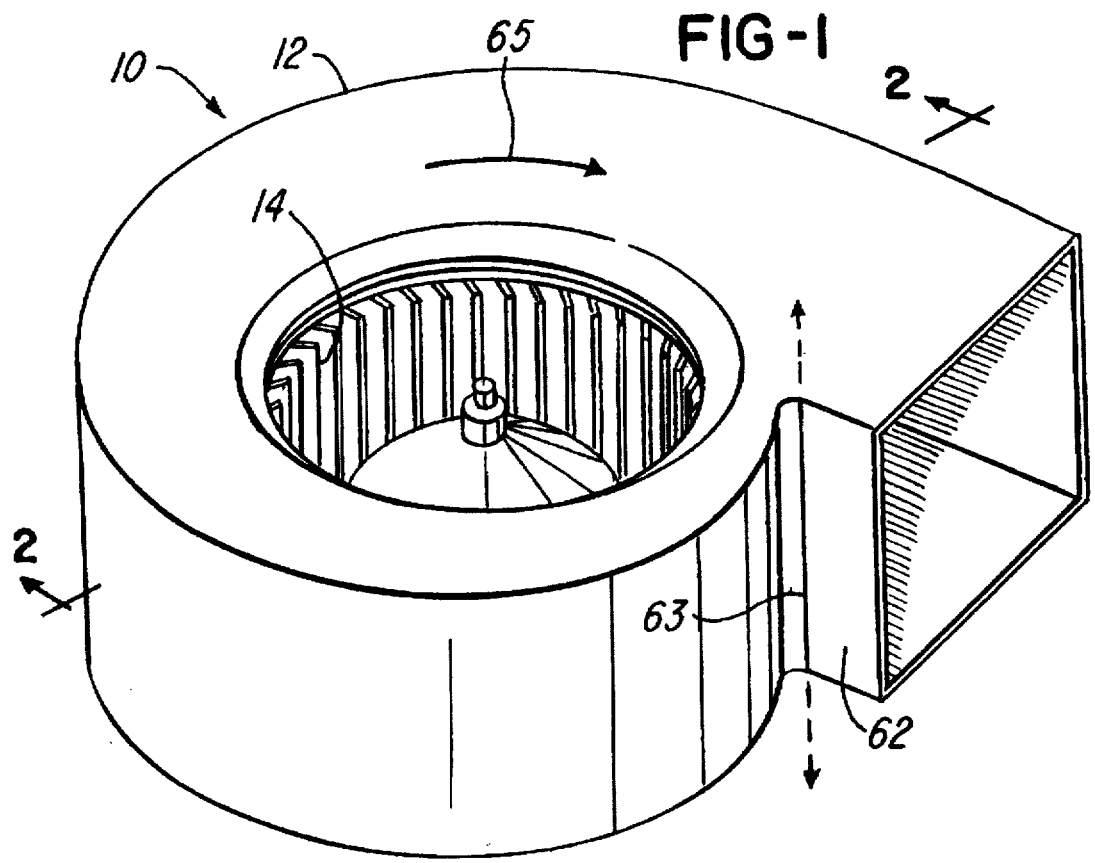
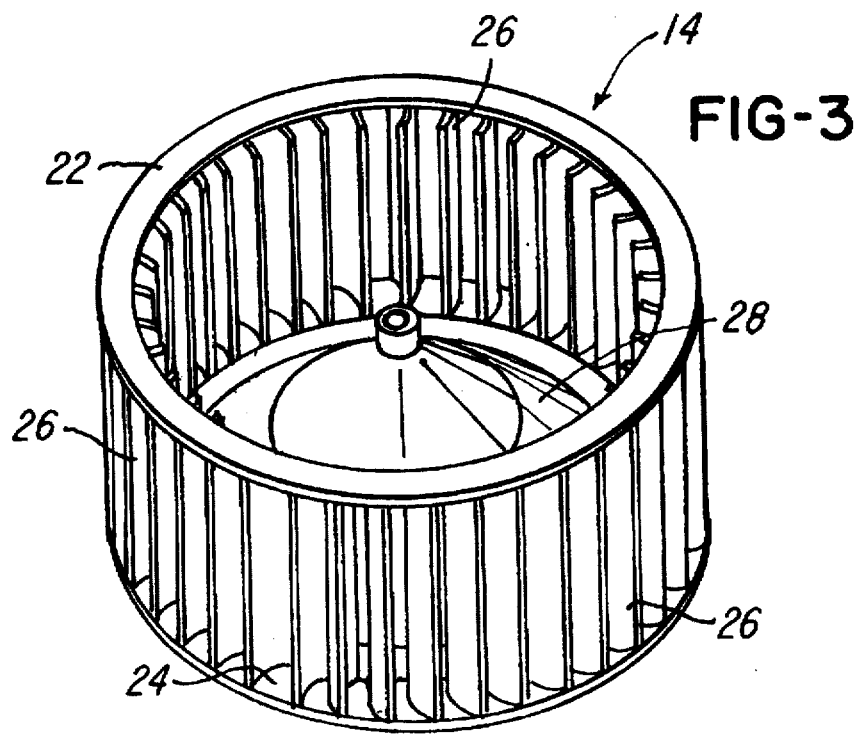

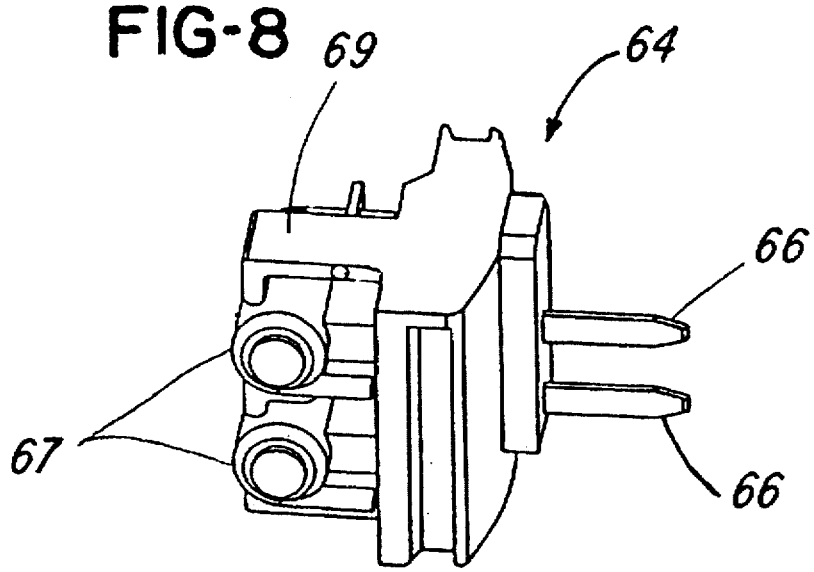
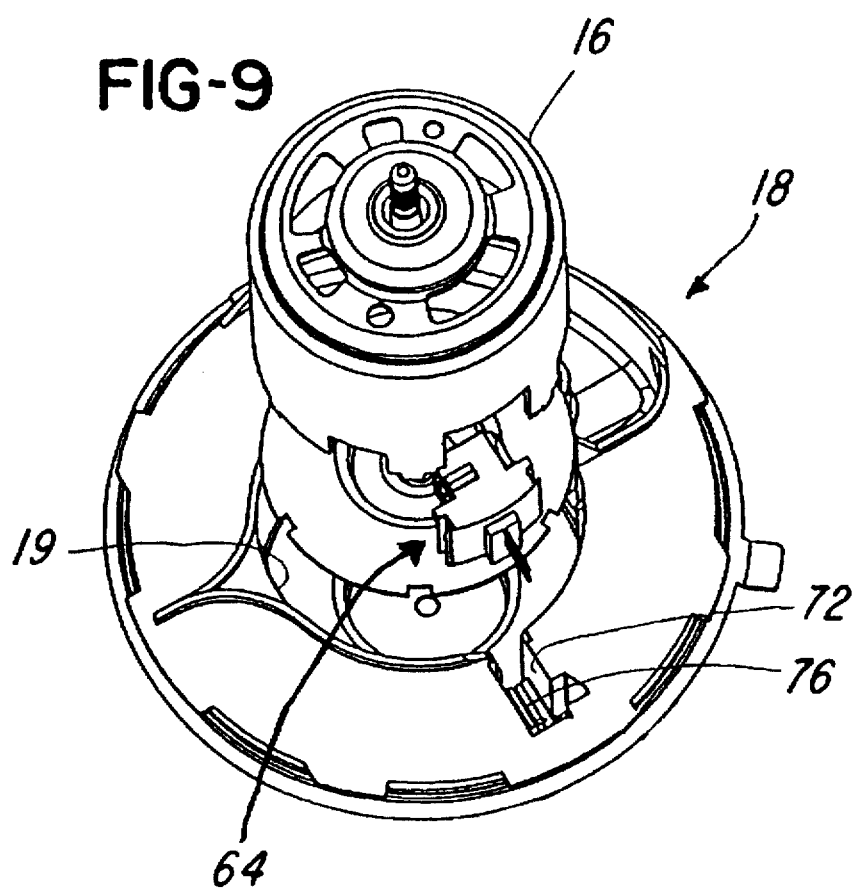

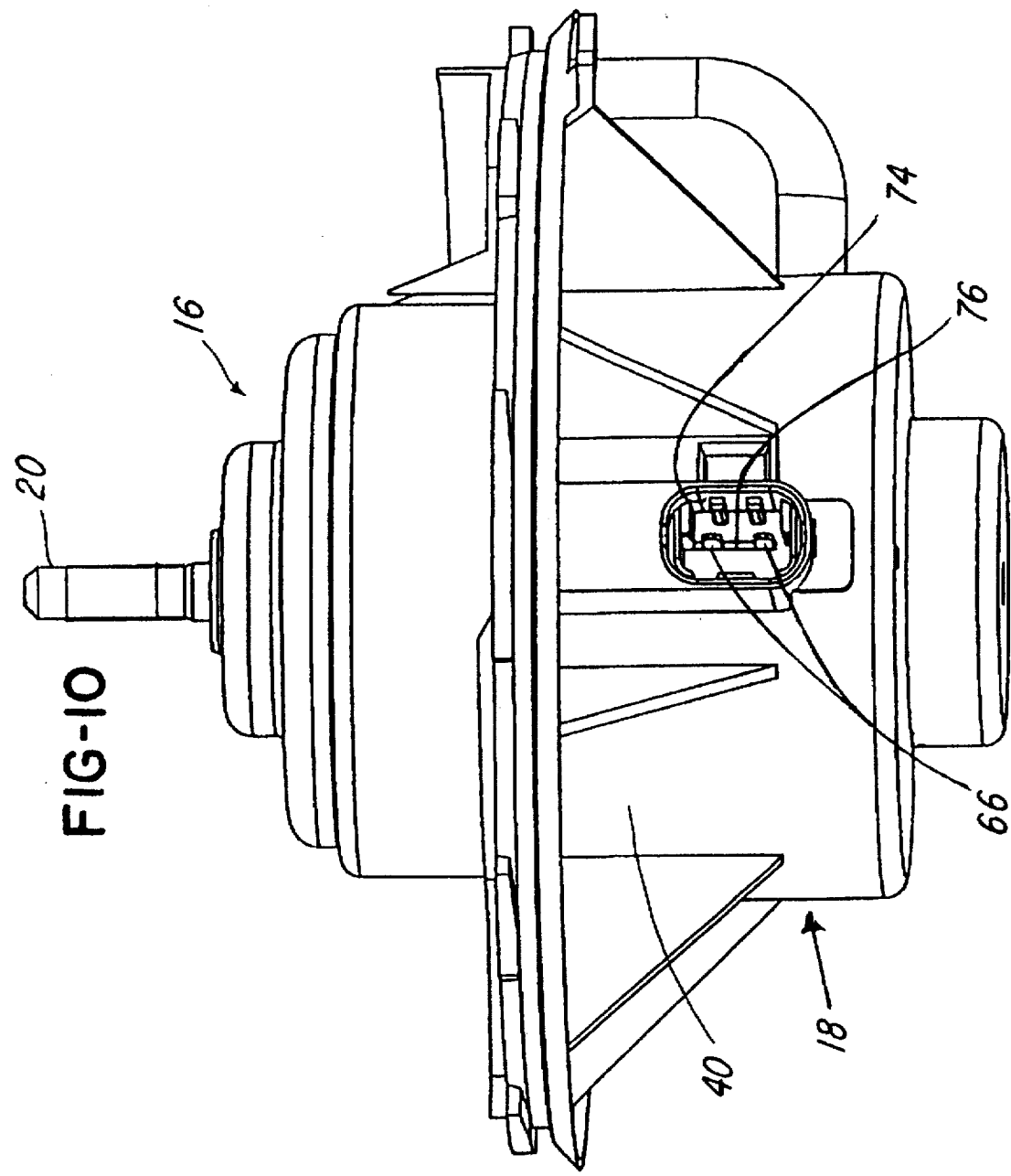

5,743,721

BLOWER ASSEMBLY HAVING INTEGRAL AIR FLOW COOLING DUCT

BACKGROUND OF THE INVENTION

The present invention generally relates to an apparatus for generating a flow of air, and more particularly relates to a blower assembly having an integral air flow cooling duct to provide cooling air for a drive motor.

A blower assembly is used in an automobile for generating a flow of air. This flow of air is then advanced to the interior of the automobile. The flow of air may be heated or cooled depending on the ambient weather conditions and the desire of the operator.

A blower assembly includes a motor for rotating a fan within a housing. The motor generates heat which may be detrimental to the operation of the motor. For instance, the motor may operate less efficiently or have a reduced operating life at higher temperatures, or alternatively, the internal components of the motor may burn or melt thus resulting in failure of the motor.

It is known to provide a flow of cool air to the motor of the blower assembly so as to reduce its temperature. This flow of cool air is usually obtained by channeling some of the air flow generated by the fan and directing the channeled air flow toward the motor.

However, some of the designs of mechanisms used to guide air flow from the fan toward the motor are inefficient. Also, some of these designs have many parts and are time consuming and expensive to assemble.

SUMMARY OF THE INVENTION

In accordance with one embodiment of the present invention, there is provided a blower assembly which includes a motor cover having (1) a body portion defining a motor cavity, (2) an air flow guide surface connected to an end of the body portion, the guide surface extending radially outwardly from the body portion, and (3) a cooling duct integrally formed with the body portion and having an inlet and an outlet, the inlet being located at the end of the body portion and the outlet being defined in a sidewall of the body portion. The blower assembly further includes a motor positionable in the motor cavity, the motor having a motor shaft having a central axis. In addition, the blower assembly includes a fan housing is connected to the motor cover, wherein (1) the fan housing defines a scroll cut-off line, and (2) a plane passes through the scroll cut-off line and the central axis, and (3) the cooling duct is positioned adjacent to the plane.

Pursuant to another embodiment of the present invention, there is provided a blower assembly which includes (1) a motor having a rotatable shaft, (2) a fan attached to the rotatable shaft, (3) a motor cover which receives the motor therein, and (4) a housing which contains the fan therein. The fan includes a first support and a second support. The fan further includes a plurality of blower vanes secured between the first support and the second support. In addition, the fan includes a connection member attached to the second support, the connection member being secured to the rotatable shaft of the motor. The fan also includes a number of secondary vanes attached to the connection member for generating a flow of air toward the motor cover, the secondary vanes being positioned over the motor.

According to yet another embodiment of the present invention, there is provided a motor cover including a body portion defining a motor cavity. The motor cover further includes an air flow guide surface connected to an end of the body portion, the air flow guide surface extending radially outwardly from the body portion. In addition, the motor cover includes a cooling duct integrally formed with the body portion and having an inlet and an outlet, the inlet being located at the end of the body portion, and the outlet being defined in a sidewall of the body portion, wherein the cooling duct defines a channel having a first width at the inlet which is greater than a second width at an intermediate location in the channel which is between the inlet and the outlet.

According to another embodiment of the present invention, there is provided a motor cover which includes a body portion defining a motor cavity. The motor cover further includes an air flow guide surface connected to an end of the body portion, the guide surface extending radially outwardly from the body portion. The motor cover additionally includes a cooling duct integrally formed with the body portion and having an inlet and an outlet, the inlet being located at the end of the body portion and the outlet being defined in a sidewall of the body portion. Moreover, the motor cover includes a baffle located on the guide surface, the baffle separating a flow of cool fan air which is being advanced into the cooling duct from a flow of warm exhaust air which is being advanced out of the motor cavity.

Pursuant to still another embodiment of the present invention, there is provided a blower assembly which includes a motor having a rotatable shaft. The blower assembly further includes a fan attached to the rotatable shaft, the fan defining a circular rotational path when the motor is operating, and the circular rotational path having a fan radius. Moreover, the blower assembly includes a motor cover which receives the motor therein, the motor cover having (1) a body portion defining a motor cavity, (2) an air flow guide surface connected to an end of the body portion, the guide surface extending radially outwardly from the body portion, (3) a cooling duct integrally formed with the body portion and having an inlet and an outlet, the inlet being located at the end of the body portion and the outlet being defined in a sidewall of the motor cavity, wherein an outer wall of the cooling duct is located a distance away from an axis of the rotatable shaft, and the distance is greater than the fan radius.

According to yet another embodiment of the present invention, there is provided a motor cover which includes a body portion defining a motor cavity for receiving a motor therein. The motor cover includes a connector housing attached to the body portion, the connector housing (1) defining a connector cavity, and (2) having an access opening located outside of the body portion, wherein a slot is defined in the body portion between the motor cavity and the connector cavity.

It is therefore an object of the present invention to provide a new and useful blower assembly.

It is another object of the present invention to provide an improved blower assembly.

It is moreover an object of the present invention to provide a new and useful motor cover.

It is still another object of the present invention to provide an improved motor cover.

It is also an object of the present invention to provide a blower assembly which guides air flow toward the motor in an efficient manner.

It is still another object of the present invention to provide a blower assembly which consists of fewer parts.

It is still another object of the present invention to provide a blower assembly which is easy to assemble.

The above and other objects, features, and advantages of the present invention will become apparent from the following description and attached drawings.

BRIEF DESCRIPTION OF THE DRAWINGS

FIG. 1 is a perspective view of a blower assembly which incorporates the features of the present invention therein;

FIG. 3 is a perspective view of the fan of the blower assembly of FIG. 1;

FIG. 8 is a perspective view of the electrical coupling of the motor of FIG. 7;

FIG. 9 is an exploded perspective view of the motor and motor cover of FIG. 7; and FIG. 10 is a side elevational view of the motor and motor cover of FIG. 7.

DETAILED DESCRIPTION OF THE PREFERRED EMBODIMENT

Figure 2:
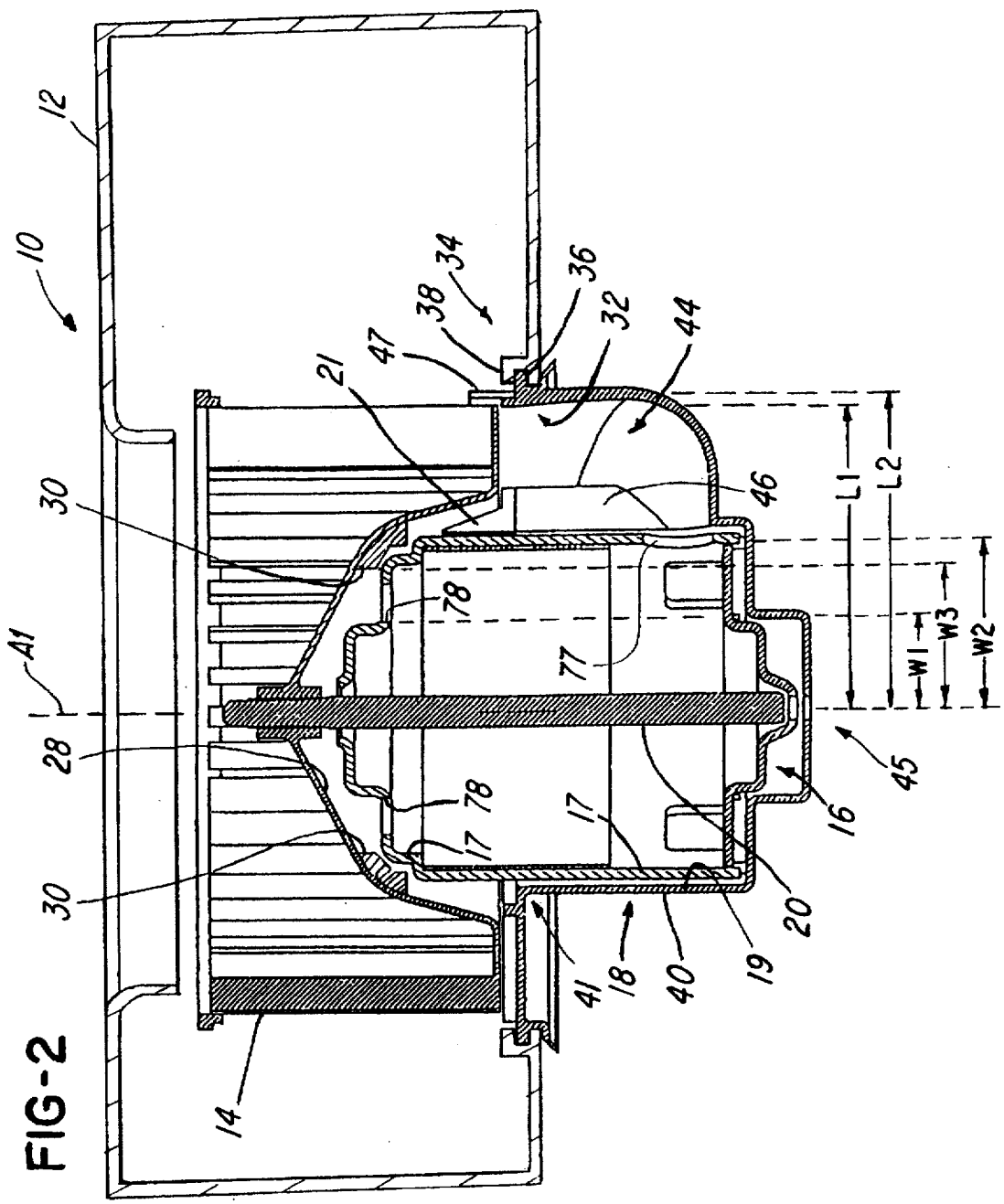
FIG. 2 is a cross-sectional view of the blower assembly of FIG. 1 taken along the line 2—2 of FIG. 1 as viewed in the direction of the arrows.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIGS. 1–2, there is shown a blower assembly 10 which incorporates the features of the present invention therein. The blower assembly 10 includes a housing 12, a fan 14, a motor 16 and a motor cover 18.

The motor cover 18 includes a first attachment mechanism 32 while the housing 12 includes a second attachment mechanism 34. The first attachment mechanism 32 cooperates with the second attachment mechanism 34 to secure the motor cover 18 to the housing 12. In particular, the first attachment mechanism 32 includes a plurality of attachment members 36 while the second attachment mechanism includes a plurality of receptacles 38. The plurality of receptacles 38 are configured to receive and engage the plurality of attachment members 36 so as to secure the motor cover 18 to the housing 12.

The motor cover 18 defines a motor cavity 19 (see also FIGS. 4 and 5) in which the motor 16 is located. The motor 16 includes a rotatable shaft 20. The fan 14 is attached to the rotatable shaft 20. The fan 14 is contained within the housing 12. The motor 16 further includes a housing 17 having a number of inlet ports 77 and outlet ports 78.

As shown in FIG. 3, the fan 14 includes an upper support member 22 and a lower support member 24. A plurality of blower vanes 26 are secured between the upper support member 22 and the lower support member 24. The fan 14 further includes a connection member 28 attached between the lower support member 24 and the rotatable shaft 20 of the motor 16 (see also FIG. 2). The fan 14 further includes a number of secondary vanes 30 attached to an underside of the connection member 28 (see FIG. 2). During rotation of the fan 14, the secondary vanes 30 function to assist generation of a flow of air which is pulled through the motor 16 and then directed downwardly toward the motor cover 18. The fan rotates in the direction of arrow 65 as shown in FIGS. 1, 4, 5 and 6.

Figure 4:
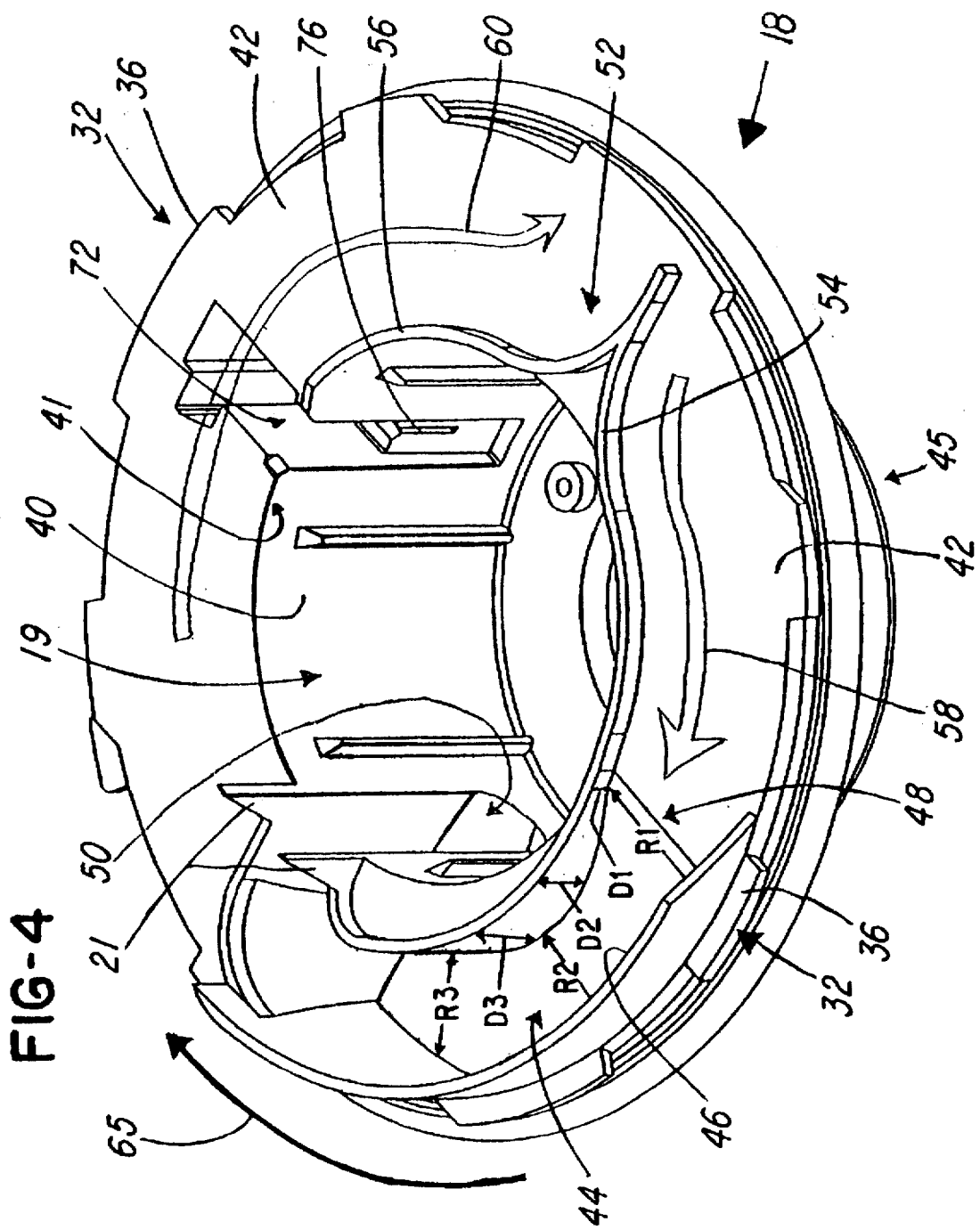
FIG. 4 is a first perspective view of the motor cover of the blower assembly of FIG. 1.
Figure 5:
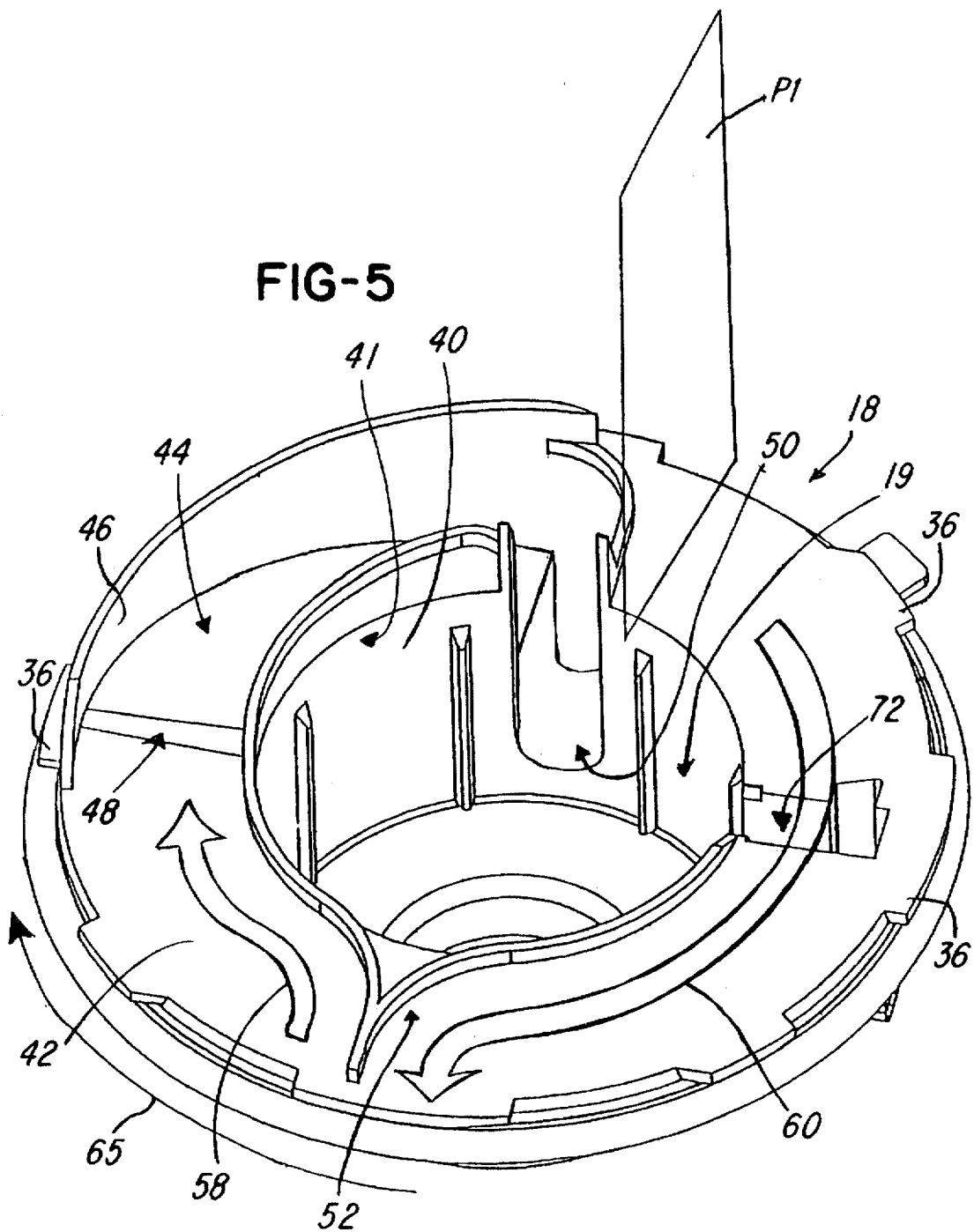
FIG. 5 is a second perspective view of the motor cover of the blower assembly of FIG. 1.

As shown in FIGS. 4 and 5, the motor cover 18 includes a body portion 40 and an air flow guide surface 42. The guide surface 42 is connected to a first end 41 of the body portion 40. The guide surface 42 extends radially outwardly from the body portion 40. The motor cover 18 additionally includes a cooling duct 44 which is integrally formed with the body portion 40.

The cooling duct 44 defines a channel 46 having an inlet 48 and an outlet 50. The inlet 48 is located at the first end 41 of the body portion 40 while the outlet 50 is defined in a sidewall of the body portion 40 at a location between the first end 41 of the body portion 40 and a second end 45 of the body portion 40. Projecting upwardly from the cooling duct 44 at a location adjacent the motor cavity 19 is a pair of fingers 21. The fingers 21 are positioned adjacent to the motor 16 when the motor is located within the body portion 40 of the motor cover 18 as shown in FIG. 2.

The channel 46 has a first width R1 at the inlet 48 of the cooling duct 44 (see FIG. 4). The channel's width continuously decreases from the inlet 48 to an intermediate location near the outlet 50 (i.e. a location which is intermediate the inlet 48 and the outlet 50). This is indicated by the width markings R1, R2 and R3, where R1>R2>R3.

The channel 46 also has a depth D1 at the inlet 48 of the cooling duct 44. The channel's depth continuously increases from the inlet 48 to the above intermediate location near the outlet 50. This is indicated by the depth markings D1, D2 and D3, where D1<D2<D3.

Since the channel depth increases while the channel width decreases, the channel 46 maintains a nearly-constant cross sectional area in the flow direction which provides superior air flow characteristics to the channel 46.

The fan 14 defines a circular rotational path which has a radius L1 relative to the axis A1 of the shaft 20 of the motor 16 (see FIG. 2). The channel 46 is configured such that an outer wall 47 of the channel is spaced a distance L2 from the axis A1 of the shaft 20. This feature allows the cooling duct 44 to directly receive some of the air flow being generated by the fan 14 in the radial direction for subsequent advancement into the motor cavity 19.

The motor cover 18 also includes a baffle 52 for guiding air flow which is adjacent to the guide surface 42 of the motor cover 18. In particular, the baffle 52 includes a first baffle portion 54 for guiding a flow of cool fan air 58 into the cooling duct 44, and a second baffle portion 56 for guiding a flow of warm exhaust air 60 out of the motor cavity 19. In operation, the baffle 52 keeps the flow of cool fan air 58 separate from the flow of warm exhaust air 60.

Figure 6:
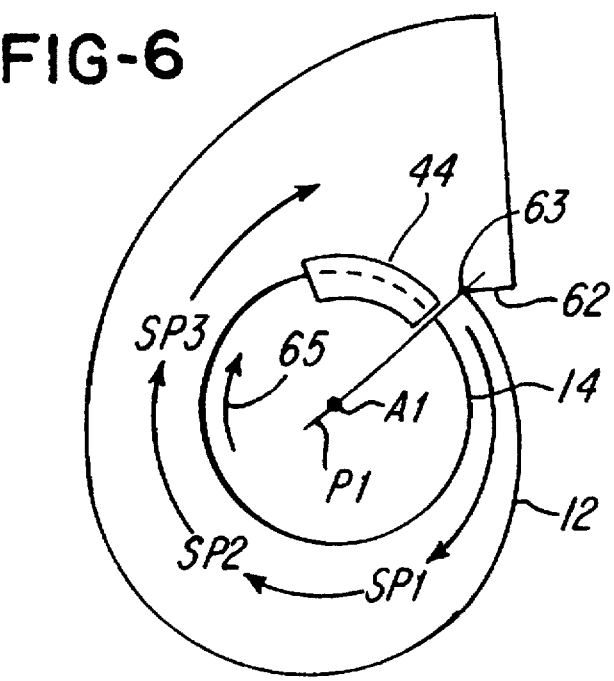
FIG. 6 is an view of a profile of the bottom of the fan and the housing of the blower assembly of FIG. 1, with the cooling duct of the motor cover shown in relation to a plane defined by a cut-off wall of the housing.
Figure 7:
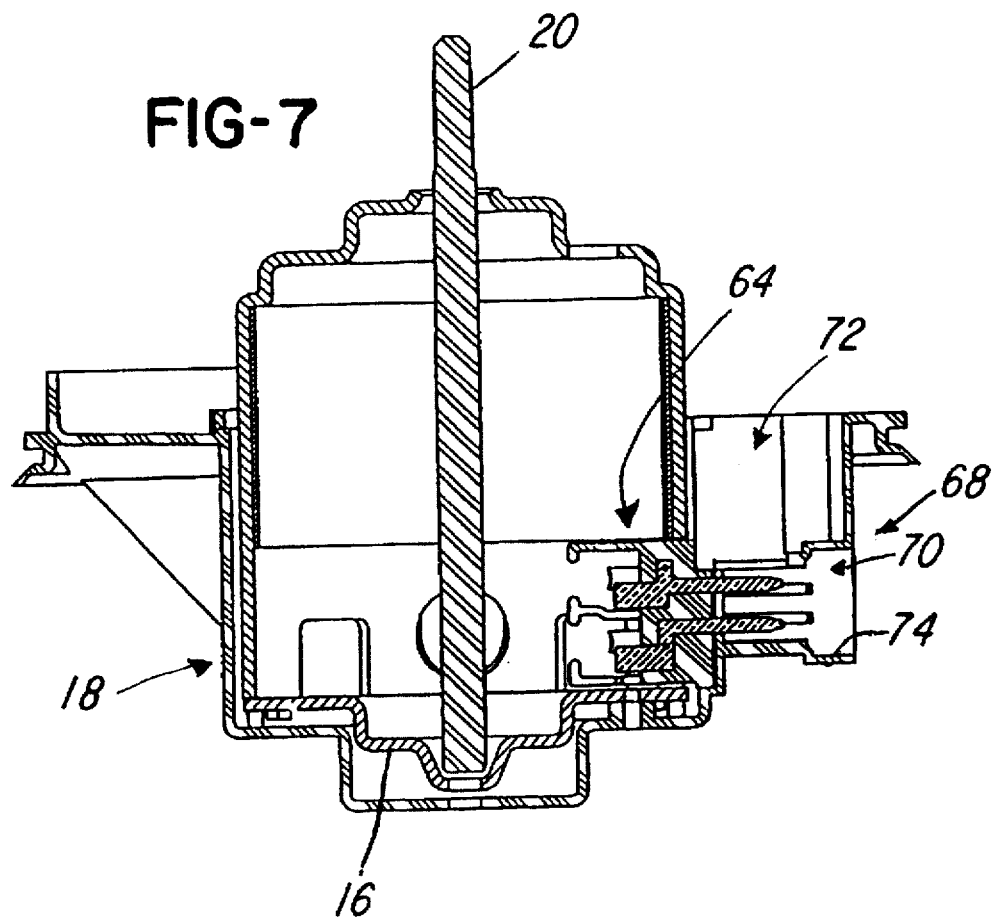
FIG. 7 is a cross-sectional view of the motor and motor cover of the blower assembly of FIG. 1.

Referring again to FIG. 1, the housing 12 defines a planar scroll cut-off wall 62. A scroll cut-off line 63 is defined by the vertically-oriented edge of the cut-off wall 62 which is closest to the fan 14 as shown in FIG. 1. A plane P1 passes through the cut-off line 63 and the axis A1 as shown in FIG. 6. The plane P1 is also shown in FIG. 5. The cooling duct 44 is positioned adjacent to the plane P1 on the upstream side of the plane relative to the rotational direction of the fan 14 as shown in FIGS. 5 and 6. This feature is beneficial due to the high static pressure created by the fan 14 at the location which is adjacent to the opening of the cooling duct 44. FIG. 6 shows a profile of the bottom of fan 14 and housing 12 which is located adjacent to the guide surface 42 of the motor cover 18. In particular, the static pressure created by the fan 14 at location SP3 (see FIG. 6) is greater than the static pressure at location SP2. Similarly, the static pressure at location SP2 is greater than the static pressure at location SP1. This difference in static pressure is due to the geometry of the housing 12. The optimum location for the opening of the cooling duct 44 is at an area of highest static pressure within the system. This is true because the outlet 50 is located at an area of lower static pressure, and thus a pressure gradient exists that causes the air flow from the bottom of the fan 14 to the motor cavity 19. There is a correspondence between the magnitude of static pressure at the opening of the cooling duct 44 and the magnitude of the flow of air from the bottom of the fan 14 to the motor cavity 19. In particular, the higher the static pressure at the opening of the cooling duct 44, the stronger the flow of air from the bottom of the fan 14 to the motor cavity 19.

In operation, the flow of cool fan air 58 is directed into the cooling duct 44 and then is advanced into the inlet ports 77 of the motor 16 (see FIG. 2). Thereafter, the flow of air is advanced through the motor 16 to the outlet ports 78 of the motor 16 (see FIG. 2). During advancement within the motor 16, the flow of cool fan air increases in temperature so as to change to the flow of warm exhaust air 60 which is advanced out of the outlet ports 78. Then, the flow of warm fan air 60 is guided downwardly to the guide surface 42 by pressure differences. Thereafter, the flow of warm fan air 60 is guided away from the motor 16 by the second baffle portion 56 as shown in FIG. 4.

It should be noted that the outlet ports 78 are located a distance W1 away from the axis A1 of the motor 16, while the inlet ports 78 are located a distance W2 away from the axis A2 of the motor 16 (see FIG. 2). Further, it should be noted that the secondary vanes 30 are located a distance W3 away from the axis A1 of the motor 16. Beneficial air flow is created by the secondary vanes 30 when the W1<W3<W2.

Referring now to FIGS. 7–10, the motor 16 includes an electrical coupling 64. The electrical coupling 64 includes a pair of terminal blades 66, a pair of inductors 67 and a clip 69. The motor cover 18 includes a connector housing 68 which is integrally formed with the body portion 40 of the motor cover. The connector housing 68 defines a connector cavity 70 and an insertion cavity 72. The connector housing 68 further defines an access opening 74 which is located outside of the body portion 40. A slot 76 is defined between the motor cavity 19 and the connector cavity 70 as shown in FIGS. 4, 9 and 10.

During assembly of the blower assembly 10, the motor 16 including the electrical coupling 64 is inserted into the body cavity 19 so that the pair of terminal blades 66 are advanced through the insertion cavity 72. Then, the terminal blades 66 are further advanced through the slot 76 and into the connector cavity 70. FIG. 9 shows approach of the motor 16 including the electrical coupling 64 toward the motor cavity 19. FIGS. 9 and 10 show the motor 16 including the electrical coupling 64 properly positioned within the body cavity 19. As properly positioned, the pair of terminal blades extend through the slot 76 and into the connector cavity 70. The access opening 74 allows access to the pair of terminal blades 66 when the blower assembly 10 is fully assembled.

It should be noted that the connector housing 68 and the pair of terminal blades 66 combine together to form a standard electrical connector (e.g. a standard Packard 280 series connector). Note that the connector housing 68 of the motor cover 18 is configured such that no additional parts, besides the electrical coupling 64, are needed in order to create a standard connector used in automotive applications.

Moreover, it should be appreciated that if it is necessary to change the type of connector of the blower assembly, a different connector housing 68 could molded into the motor cover 18 to accommodate this change. This would enable changes in the connector without requiring corresponding changes in the design of the motor 16.

During operation of the motor 16, the access opening 74 of the connector housing 68 is sealed by using a sealed mating connector (not shown) so as to keep the motor cover 18 air tight.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A blower assembly, comprising:

a motor cover having (1) a body portion defining a motor cavity, (2) an air flow guide surface connected to an end of said body portion, said guide surface extending radially outwardly from said body portion, and (3) a cooling duct integrally formed with said body portion and having an inlet and an outlet, said inlet being located at the end of said body portion and said outlet being defined in a sidewall of said motor cavity;

a motor positionable in the motor cavity, said motor having a motor shaft having a central axis; and a fan housing connected to said motor cover, wherein (1) said fan housing defines a scroll cut-off line, and (2) a plane passes through the scroll cut-off line and the central axis, and (3) the cooling duct is positioned adjacent to the plane.

2. The blower assembly of claim 1, further comprising:

a fan positioned within the fan housing, wherein (1) said fan rotates in a rotational direction, and (2) the cooling duct is positioned on the upstream side of the plane relative to the rotational direction of said fan.

3. A blower assembly, comprising:

a motor having a rotatable shaft;

a fan attached to the rotatable shaft, said fan defining a circular rotational path when said motor is operating, and said circular rotational path having a fan radius; and a motor cover which receives said motor therein, said motor cover having (1) a body portion defining a motor cavity, (2) an air flow guide surface connected to an end of said body portion, said guide surface extending radially outwardly from said body portion, (3) a cooling duct integrally formed with the body portion and having an inlet and an outlet, said inlet being located at the end of said body portion and said outlet being defined in a sidewall of the motor cavity, wherein an outer wall of said cooling duct is located a distance away from an axis of the rotatable shaft, and said distance is greater than said fan radius.

* * * * *